United States Patent [19]

Kostas et al.

[11] 4,305,028

[45] Dec. 8, 1981

[54] SYSTEM FOR EVALUATING THE CAPABILITY OF A WORK-PERFORMING ROBOT TO REPRODUCE A PROGRAMMED SERIES OF MOTIONS

[75] Inventors: Evans Kostas, Bay Village; Gerald W. Crum, Elyria; Jerome F. Walker, Shaker Heights, all of Ohio

[73] Assignee: Nordson Corporation, Amherst, Ohio

[21] Appl. No.: 137,234

[22] Filed: Apr. 4, 1980

[51] Int. Cl.³ .............................................. G05B 23/02
[52] U.S. Cl. .................................... 318/565; 318/566; 318/568; 318/571; 318/644; 318/645; 318/651; 318/465; 318/458; 318/488; 318/490; 340/648; 340/679; 414/4; 346/18
[58] Field of Search ............... 318/563, 562, 565, 566, 318/568, 571, 644, 645, 651, 434, 461, 462, 463, 464, 465, 456, 458, 490, 488; 414/4, 5, 6; 340/648, 669, 670, 671, 679, 680; 346/17, 18

[56] References Cited

U.S. PATENT DOCUMENTS 4,239,431 12/1980 Davini .................................... 414/4

FOREIGN PATENT DOCUMENTS 2002142 2/1979 United Kingdom ................ 318/568

*Primary Examiner*—J. V. Truhe
*Assistant Examiner*—Eugene S. Indyk
*Attorney, Agent, or Firm*—Wood, Herron & Evans

[57] ABSTRACT

A system for evaluating whether a work-performing robot can perform a series of programmed motions is disclosed which includes means for continuously comparing the velocity of the various links of a robot simulator, which is manually moved through the sequence of motions to be programmed, against predetermined velocity limits associated with the corresponding links of the work-performing robot which will reproduce the programmed steps, and providing humanly perceptible alarm indications uniquely identifiable with the various robot links when the motions manually programmed on the robot simulator exceed the velocity limits of the work-performing robot. Additionally, the individual velocities of the various robot simulator links are summed, and the sum continuously compared against the power limit of the hydraulic pump driving the link actuators of the work-performing robot. Should the aggregate velocity of the robot simulator links exceed the power capability of the hydraulic pump, that is, the pump capacity, an alarm indication is provided. In spray coating robot applications, the alarm indications occasioned by excessive link velocities, as well as excessive demands on the hydraulic pump, are recorded along with information indicating whether or not during a particular alarm condition the spray gun was ON or OFF. This record enables the manually programmed motion sequence to be evaluated to determine whether or not the alarm conditions which occurred during programming can be safely ignored and the program used to operate the work-performing robot.

22 Claims, 5 Drawing Figures

SYSTEM FOR EVALUATING THE CAPABILITY OF A WORK-PERFORMING ROBOT TO REPRODUCE A PROGRAMMED SERIES OF MOTIONS

This invention relates to programmable robots, and more particularly to a system for evaluating whether a programmed sequence of motions can be performed by a work-performing robot without exceeding predetermined velocity limits or overloading the actuators which drive the robot links and/or the power source which energizes the robot link actuators.

A work-performing robot may be incapable of performing a desired sequence of programmed motions for several reasons. For example, it is possible the programmed motion sequence requires the robot links to move with velocities which the link actuators are incapable of producing by reason of inherent limitations in their size and/or capacity. Independent of whether the programmed motions will overload the link actuators, the robot may be incapable of performing the desired sequence because its power source is overloaded. More specifically, the power source for the actuators, such as an hydraulic pump if actuators of the electrohydraulic type are used, may have its power limit, or capacity, exceeded, that is, the pump may be incapable of providing pressurized fluid simultaneously to all the actuators at rates sufficient to simultaneously drive their respective links at the desired programmed velocities. Independent of limitations of the system pump and/or link actuators, the work-performing robot may be unable to execute a series of programmed motions due to limitations inherent in the electronic controller which processes the programmed sequence of link command signals which ultimately control the link actuators.

It is often desirable to know in advance whether or not a particular programmed sequence of motions can be performed by a robot having specified controller, actuator, and/or pump limitations. For example, if a prospective robot user is contemplating use of a work-performing robot for a specific task, such as spray coating a specific article, the prospective user may wish to determine at the outset, that is, before an actual attempt is made with the work-performing robot, whether the specific robot under consideration can perform the task which the prospective user contemplates. Without such advance information, it is entirely possible that the prospective robot user could attempt to perform a specific task which the work-performing robot, by reason of inherent physical limitations in its actuators. controller, and/or power supply, is incapable of performing.

In the past it has been difficult, if not impossible, to determine whether a work-performing robot can successfully perform a programmed sequence of motions without actually inputting the programmed sequence to the robot and observing if it, in fact, does perform the program. Accordingly, it has been an objective of this invention to provide a system for predetermining whether a programmed motion sequence can be repeated by a work-performing robot having velocity limits associated with its various links without actually inputting the program to the robot. This objective has been accomplished in accordance with certain of the principles of this invention by providing a robot simulator having lightweight links and joints which, during the program-preparation phase, can be manually manipulated by an operator to perform the sequence of motions it is desired to have the work-performing robot subsequently repeat under program control, and continuously comparing the velocity of the various robot simulator links during program-preparation against velocity limitations of the corresponding links of the work-performing robot and, in the event one or more of the velocity limitations is exceeded during programming, providing a humanly perceptible alarm indication to the programming operator.

In a preferred form of the invention the velocity of each of the links of the robot simulator is continuously compared during manual programming with separate velocity limitations respectively associated with the different links of the work-performing robot. In the event one or more of the velocity limitations of the links of the work-performing robot is exceeded, a separate humanly perceptible alarm is provided which is uniquely associated with the particular work-performing robot link whose velocity limit has been exceeded.

In accordance with a further aspect of the invention, the individual velocities of all of the robot simulator links are summed, and the sum is compared to a reference value correlated to the power limitations of the source which energizes the individual actuators of the different work-performing robot links. In this manner, it is possible to determine whether the programmed motions of the various links produce velocities which, although none individually exceed their respective link velocity limits, in the aggregate exceed the power supply capabilities of the robot power source. In the event the aggregate or total of the link velocities exceeds the capabilities of the work-performing robot power source, a humanly perceptible alarm is provided, alerting the operator of this fact.

In accordance with a still further aspect of the invention designed to assist in evaluating whether alarm conditions produced by excessive link velocities and/or excessive demands on the robot power supply can be safely ignored, the condition of the utilization device being moved by the work-performing robot, such as a spray coating gun, is monitored to determine whether, when an alarm condition occurs, the gun is ON or OFF. Information respecting the ON or OFF condition of the gun during an alarm condition is recorded on a suitable print-out along with the alarm condition event. If an alarm condition event occurs when the spray coating gun is in an OFF condition, such as when returning the gun to a home position at the conclusion of a spray coating sequence, it is entirely possible the alarm condition can be safely ignored. With this ON/OFF information recorded for each alarm event, the programming operator can readily review it and determine whether the alarm event is serious enough to warrant re-programming or can be ignored.

To further assist in determining whether a particular programmed motion sequence can be performed successfully by a work-performing robot, the amount by which the velocity and/or power capability of the source is exceeded during an alarm condition is recorded along with the alarm condition event and the ON/OFF condition of the gun. If the velocity limit of one or more links and/or the capacity of the power supply is exceeded only slightly and the gun was in an OFF condition, it is possible that the alarm condition can be ignored and the program utilized to operate the work-performing robot without serious deleterious effects. By recording this information, such a determination can be readily made by the operator.

These and other features, advantages, and objectives of the invention will become readily apparent from a detailed description thereof taken in conjunction with the drawings in which.

Figure 3:
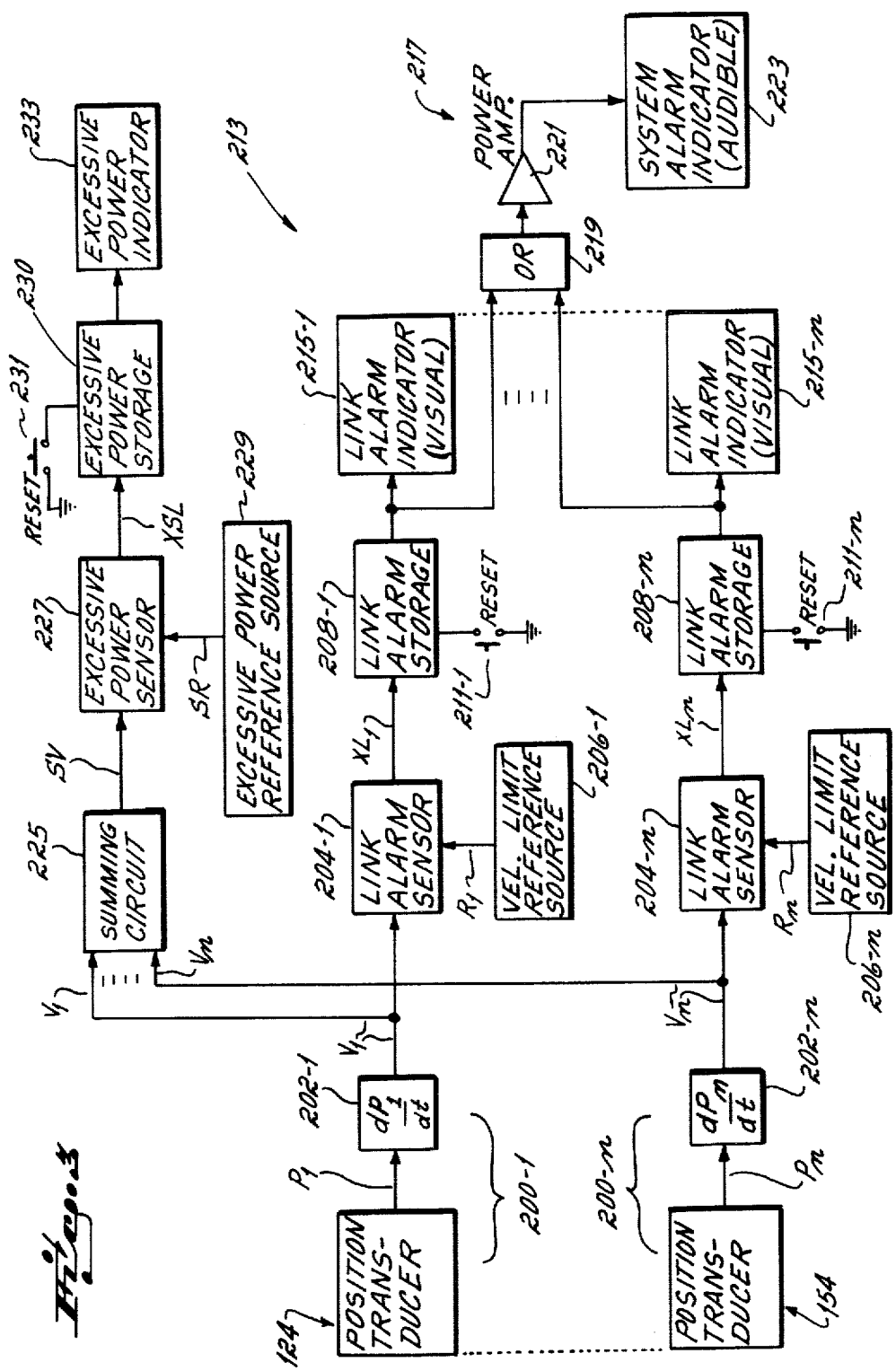

FIG. 3 is a schematic circuit, in block diagram format, showing the components which provide audible and/or visible alarms when, during manual programming with the robot simulator, the velocity of one or more of the simulator links exceeds predetermined velocity limitations associated with the corresponding work-performing robot links and/or overtaxes the capability of the power source which powers the actuators which drive the work-performing robot links.

Figure 4:
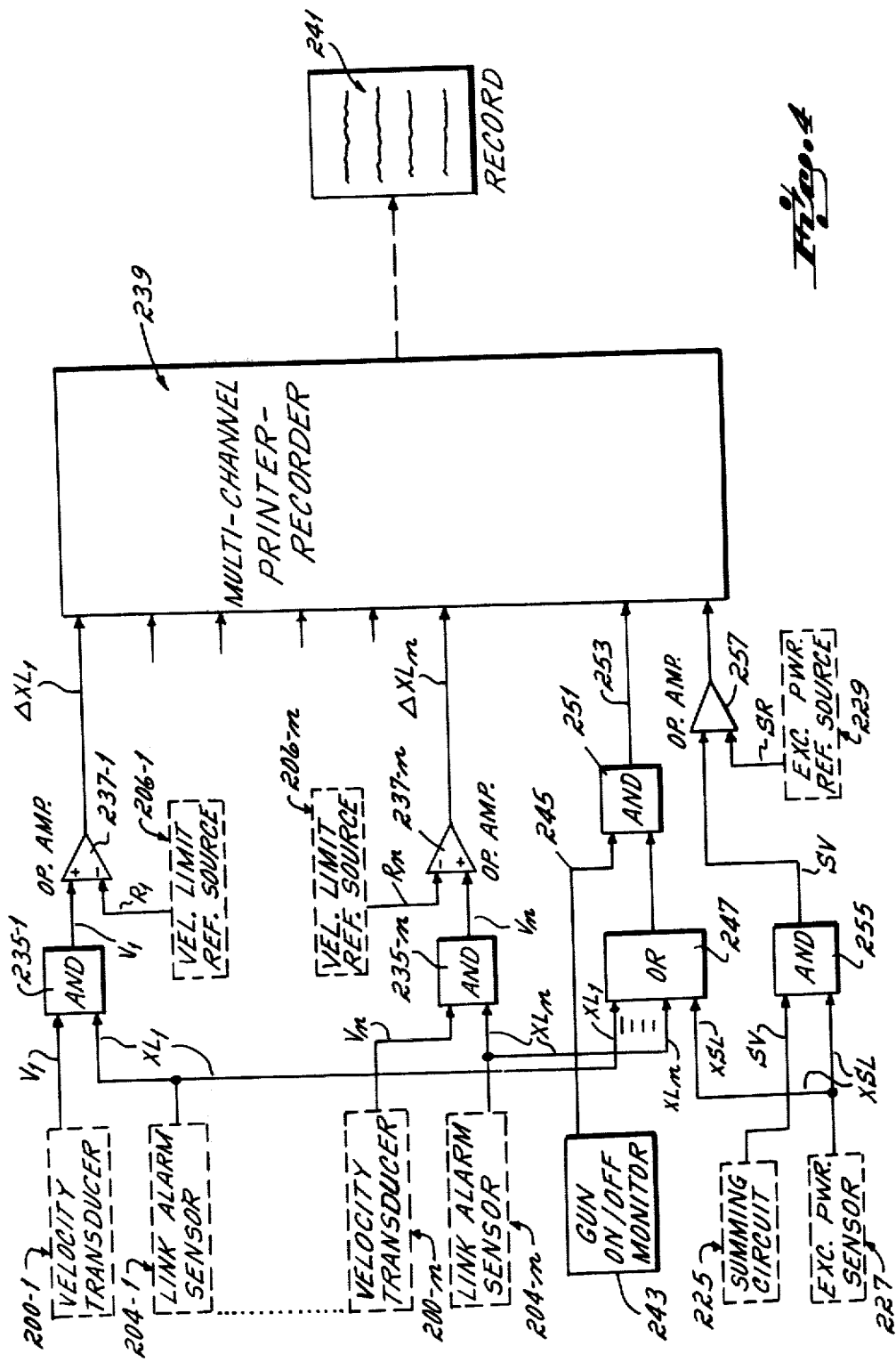

FIG. 4 is a schematic circuit, in block diagram format, showing the components which produce a record of the alarm conditions which occur in the process of manually moving the robot simulator through a sequence of programmed steps, the amount by which the velocity limits of the work-performing robot links are exceeded, and whether the spray gun or other utilization device utilized in conjunction with the robot simulator was ON or OFF when the alarm condition occurred.

Figure 5:
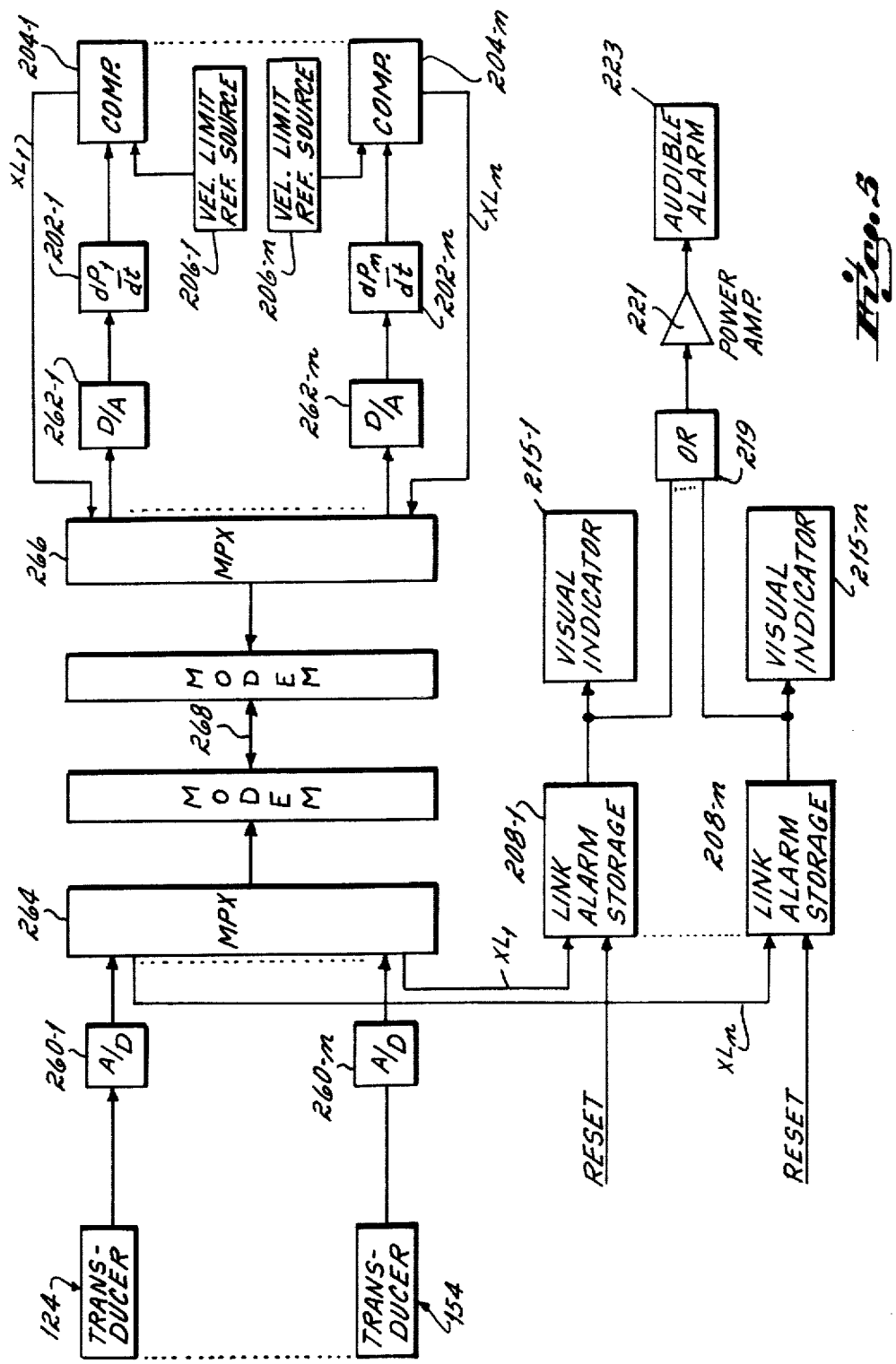

FIG. 5 is a schematic circuit, in block diagram format, of the circuit shown in FIG. 3, but with certain of the components, such as the alarm condition sensors and velocity limit reference sources, located remote from the remaining components of the circuit to which they are interconnected via a communication link.

Figure 1:
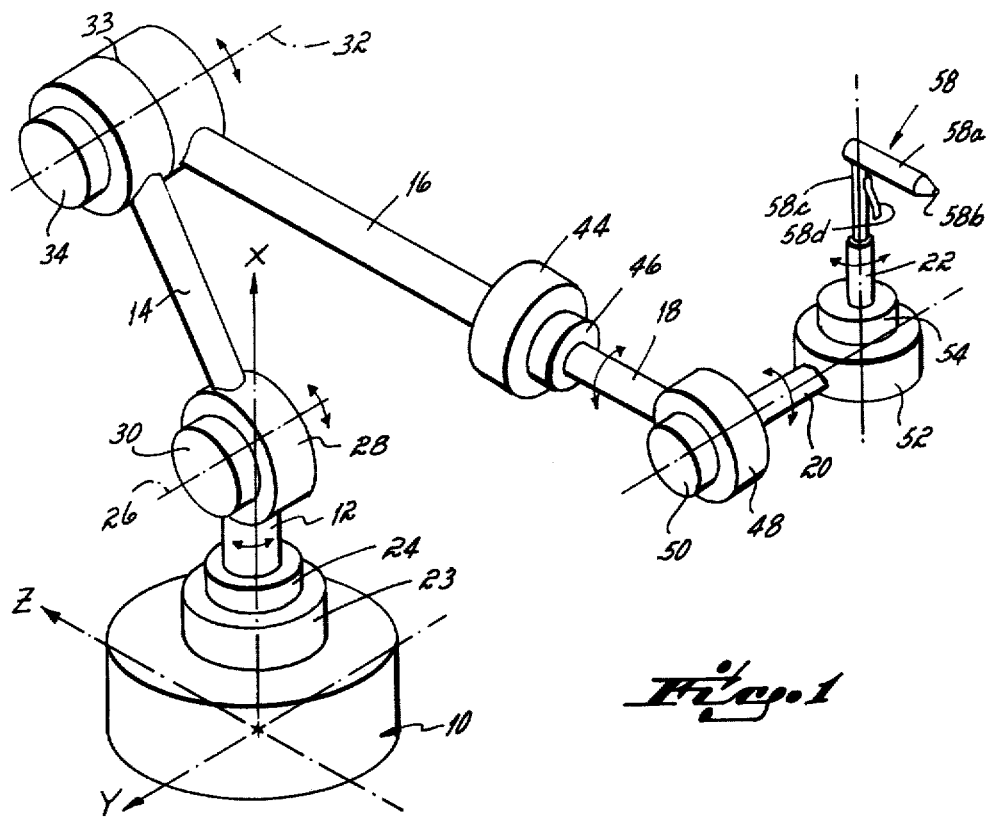
FIG. 1 is a perspective view, in schematic form, of a typical work-performing robot, showing the general relationship of the relatively massive robot links and their respectively associated actuators and position transducers.

With reference to FIG. 1, a typical work-performing robot is seen to include a base 10 which rests on the floor or other appropriate surface for supporting the robot. Extending from the base 10 are plural series-connected elongated articulated members or links 12, 14, 16, 18, 20, and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1-4 feet in length, and typically weigh in the range of 10-400 pounds each. The links 18, 20, and 22 which, in the work-performing robot shown in FIG. 1 constitute a wrist, typically are significantly less massive than the links 12, 14, and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position command signal provided by a conventional programmer (not shown) to facilitate selective bi-directional angular motion of the link 12 in an azimuthal direction about its longitudinal axis. Also associated with the link 12 is a position transducer 24 which provides an electrical signal correlated to the angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position command signal from the programmer, and facilitates selective bi-directional elevational pivotal movement of the link 14 about horizontal axis 26. Also associated with the link 14 is a position transducer 30 which provides an electrical signal correlated to the elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the angular elevational position of the link 16 with respect to the link 14. An actuator 33, associated with the link 16, is responsive to a position command signal from the programmer, and facilitates selective bi-directional elevational pivotal movement of the link 14 about horizontal axis 32.

The actuator 23 which bi-directionally drives the link 12 about the X axis provides the work-performing robot with one degree of freedom, namely, azimuthal positioning motion, while the actuators 28 and 33 which bi-directionally drive the link 14 and link 16, respectively, provide the robot with two degrees of freedom, each in an elevational direction.

The articulated links 18, 20, and 22 collectively constitute a wrist. Link 18 at its inner end is connected via a suitable joint to the outer end of the link 16. An actuator 44 is associated with the wrist member 18 for bi-directionally rotating, when input with suitable command signals from a programmer, the wrist member 18 about its longitudinal axis which is coincident with the longitudinal axis of the link 16. A suitable position transducer 46 is associated with the link 18 for providing an electrical signal correlated to the relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable command signals from a programmer, bi-directionally rotates link 20 about its longitudinal axis perpendicular to the longitudinal axis of link 18. A suitable position transducer 50 is also associated with link 20 for providing an electrical output correlated to the rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable command signals from a programmer, facilitates bi-directional motion of link 22 about its longitudinal axis. A transducer 54, also associated with link 22, provides an electrical signal output correlated to the relative rotational position of link 22 relative to link 20.

Link 22 constitutes the mechanical output element of the work-performing robot. While the mechanical output of the robot can be utilized for positioning a wide variety of devices, in the preferred form of the invention the work-performing robot is utilized to position a spray coating gun 58 having a barrel 58a with a nozzle 58b which emits coating particles. The gun handle 58c is mounted to the upper end of the wrist link 22. The gun handle 58c mounts a suitable trigger mechanism 58d which, when actuated by a suitable signal-operated device (not shown), functions to control the emission of coating particles from the nozzle 58b of the spray gun 58.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot shown in FIG. 1, a series of programmed position command signals stored in a suitable memory device of a programmer are periodically retrieved and compared against the actual position signals provided by the link position transducers 24, 30, 34, 46, 50, and 54, and in response thereto positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the commanded positions which in turn reduces the positional error signals to zero. Thus, the links of the work-performing robot of FIG. 1 are driven through the desired sequence of programmed motions, utilizing closed-loop servo techniques, by periodically comparing desired or command position signals retrieved from the memory of a programmer with actual link position signals, and using the resulting positional error signals associated with the different links to drive the various link actuators to the desired command positions.

Since the programmer, actuators, position transducers, closed-loop servo controls, and the like of the work-performing robot of FIG. 1 are well known and form no part of this invention, they are not further discussed.

Figure 2:
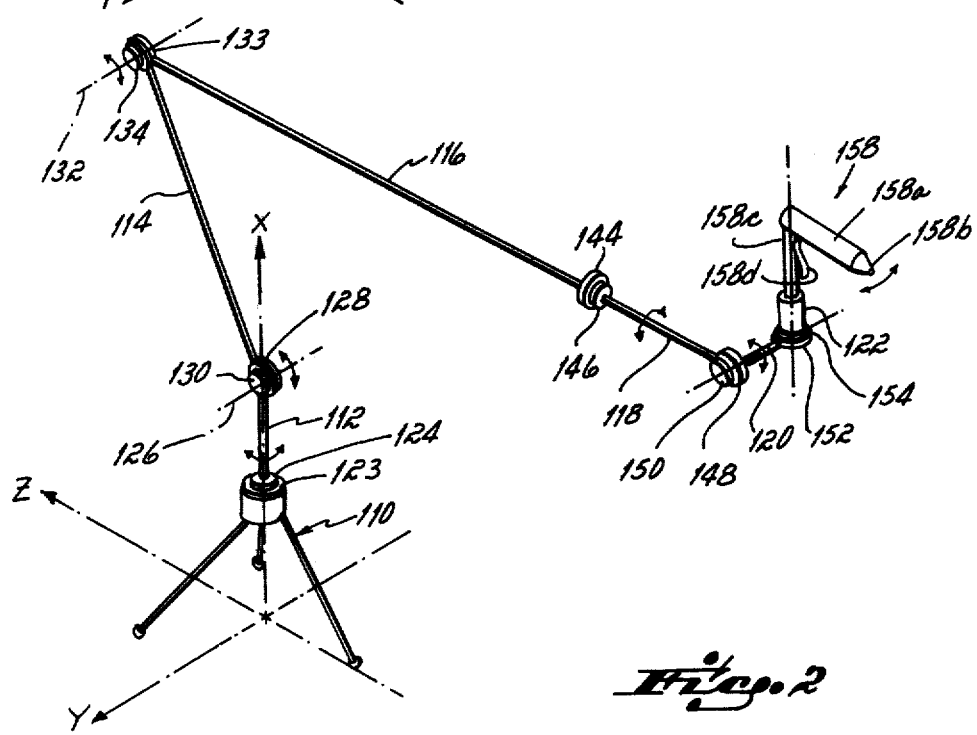
FIG. 2 is a perspective view, in schematic form, of a lightweight hand manipulable robot simulator, showing the general relationship of the simulator links and associated position transducers.

The robot simulator, shown in FIG. 2, includes a tripod base 110 from which extends vertically a link 112 which is connected to the base for rotational movement about a vertical axis by a rotary joint 123. A position transducer 124 associated with the link 112 and base 110 provides an electrical signal correlated to the angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the angular position of the link 116 with respect to the link 114.

Also included in the robot simulator depicted in FIG. 2 are links 118, 120, and 122 which are pviotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the angular position of the links 118, 120, and 122 with respect to the links 116, 118, and 120, respectively.

Mounted to the link 122 is a spray gun 158 having a barrel 158a, a nozzle 158b, and a handle 158c which mounts an ON/OFF switch 158d.

The length of the links 112, 114, 116, 118, 120, and 122 of the simulator robot of FIG. 2 are identical to the lengths of the links 12, 14, 16, 18, 20, and 22, respectively, of the work-performing robot shown in FIG. 1. Of course, the mass of the links 112, 114, 116, 118, 120, and 122 of the simulator robot of FIG. 2 are a mere fraction of that of their counterpart links 12, 14, 16, 18, 20, and 22 of the considerably more massive work-performing robot shown in FIG. 1. Similarly, the joints 123, 128, 133, 144, 148, and 152 of the simulator robot permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot.

When the spray gun 158 is moved manually by an operator grasping the handle 158c thereof through a sequence of motions necessary to spray coat an object, which is possible due to its lightweight construction, the various links 112, 114, 116, 118, 120, and 122 of the simulator robot move through a sequence of motions. Simultaneously, the transducers 124, 130, 134, 146, 150, and 154 of the simulator robot associated with the various simulator robot links 112, 114, 116, 118, 120, and 122 provide electrical outputs corresponding to the sequence of motions through which the simulator robot links move in the course of manually moving the gun through the positions necessary to coat the object. These transducer signals for the different simulator robot links can be recorded by any suitable means (not shown) and thereafter the recorded signals input to the work-performing robot actuators to cause it to reproduce the motion of the simulator robot.

In the course of moving the gun 158 through the sequence of motions necessary to spray coat the desired object, the operator periodically manually actuates the trigger 158d to emit spray coating material from the gun nozzle 158b. By recording signals corresponding to the position of switch 158d in conjunction with recording the position signals provided by the position transducers 124, 130, 134, 146, 150, and 154 of the simulator robot for the entire sequence of motions of the simulator robot links 112, 114, 116, 118, 120, and 122 produced by manual manipulation by the operator of the gun 158, a sequence of coordinated gun switch command signals and robot link position command signals can be stored. These stored command signals can then be repetitively read out from storage and used for repeating the programmed sequence of motions with the work-performing robot of FIG. 1 to coat the object with gun 58, which sequence of motions was first performed manually by the operator with the simulator robot and gun 158.

The rotary actuators 23, 28, 33, 44, 48, and 52 of the work-performing robot shown in FIG. 1 are typically of the hydraulic type, each including an electrohydraulic servo-valve for controlling the rate and direction of flow of hydraulic fluid therethrough. Typically a single hydraulic pump (not shown) is provided for supplying pressurized hydraulic fluid to all the actuators of the work-performing robot. While the hydraulic power rating of the pump, in terms of gallons per minute at a predetermined pressure, can vary depending upon the size of the pump used, for a given work-performing robot the hydraulic power capacity of the robot is fixed since it has associated with it a single hydraulic pump of predetermined physical characteristics.

By reason of the hydraulic power limits which attend the use of an hydraulic pump of predetermined physical characteristics, a limitation exists on the aggregate or total rate of flow of hydraulic fluid from the hydraulic pump to the hydraulic actuators of the work-performing robot. Since the velocity of a link of the work-performing robot is correlated to the rate of flow of hydraulic fluid to the hydraulic actuator associated with the link, the aggregate or total of the velocities of all the links of the work-performing robot is limited by the maximum flow rate which can be provided by the hydraulic pump. In practice it is often attempted to program a work-performing robot in a manner which overloads, or places excessive demands upon, the hydraulic pump, with the result that the pump is unable to supply all the fluid required by all the actuators. When this occurs the various links of the work-performing robot are unable to fully execute or achieve the programmed sequence of positions. Stated differently, the situation rises in practice that the programmed sequence of motions are such that they collectively exceed the hydraulic power limits of the pump, in which case the work-performing robot is unable to fully execute the programmed motion sequence.

In addition to the foregoing limitations on the work-performing robot which exist by reason of the inability of the hydraulic pump to supply pressurized fluid beyond some given maximum flow rate, limitations are also imposed on the ability of the work-performing robot to execute a programmed sequence of motions by reason of the inherent capacity limitations of the rotary actuators which move the various links of the work-performing robot in the commanded manner. For hydraulic fluid supplied at a predetermined pressure, an hydraulic actuator, by reason of its physical design, has a maximum flow rate above which hydraulic fluid at the predetermined pressure cannot exceed. This maximum flow rate through the hydraulic actuator of fluid at a predetermined pressure imposes a corresponding limitation on the maximum angular velocity which can be achieved by the link which is being driven by the actuator.

In practice, it is possible that the position command for one or more steps of a programmed sequence of motions will be such that the hydraulic actuator which is commanded thereby will, by reason of its inherent flow rate limitations, be unable to move the link at a velocity sufficient to position the link at the commanded position within the allotted time for that program step. Thus, the link or links fail to execute the programmed step or steps because of limitations of the actuators which drive them. This is in contrast to the previously described inability of the work-performing robot to carry out the programmed sequence of motions by reason of limitations on the power supply capability of the hydraulic pump which supplies the rotary actuators associated with the various links.

To prevent the recording and input of a sequence of programmed command positions to the work-performing robot of FIG. 1 which exceed its capabilities by reason of limitations imposed by the hydraulic pump and/or the individual link actuators, the system of FIGS. 2–5 is utilized. The system effectively monitors, on a continuous basis, the velocity of each of the links of the simulator robot of FIG. 2 during a manual programming sequence and compares them to predetermined velocity limits associated with the links of the work-performing robot of FIG. 1. If one or more of the velocity limits is exceeded, an alarm condition indication is provided to the operator. In similar fashion, the velocities of the simulator robot links are summed and the total compared to a limit corresponding to the power capacity of the pump which supplies pressurized fluid to the actuators of the work-performing robot. If this limit is exceeded a suitable system alarm condition indication is provided to the operator.

More specifically, the system continuously monitors the position signals output from the transducers 124, 130, 134, 146, 150, and 154 of the simulator robot during a manual programming operation when the gun 158 is moved by the operator through a sequence of motions necessary to spray coat a desired object. From the monitored position signals, velocity signals are derived corresponding to the velocities at which the various links of the simulator robot are moved during the robot programming sequence. The velocity signals of the simulator robot links are compared to velocity limit reference signals associated with the work-performing robot links. In the event the velocity of a link of the simulator robot produced during manual programming exceeds the velocity limit of the associated link of the work-performing robot, an alarm indication is given to the programmer, alerting the programmer to the fact that he has moved the simulator robot in a manner which exceeds the velocity limitations of one or more of the actuators of the work-performing robot. Preferably, a separate alarm indicator is provided for each link of the work-performing robot, thereby advising him as to which link has exceeded its velocity capabilities. With this knowledge, the programmer can start the programming operation again, but this time at a slower rate in an effort to complete the programmed sequence of motions without exceeding the limitations of the work-performing robot.

In addition to monitoring the actual velocities of the simulator robot links vis-a-vis the corresponding velocity limitations of the corresponding work-performing robot links, the simulator robot link velocities during the programming operation are continuously summed and the aggregate or total thereof compared to a system velocity reference correlated to the power supply limit of the hydraulic pump. If the programmed velocities collectively exceed the hydraulic power supply limits of the hydraulic pump, an excessive power, or system, alarm is provided to the operator, alerting him that while the programmed motion has not necessarily exceeded the velocity limits of the various work-performing robot link hydraulic actuators, the programmed motions have collectively exceeded the power supply limits of the hydraulic pump driving the work-performing robot link actuators. The operator, with this information, can then start the programming operation again with a view to doing it at a slower rate to avoid overloading or exceeding the power supply capabilities of the hydraulic pump supplying the work-performing robot.

It is entirely possible that the limits of one or more of the work-performing robot link actuators and/or of the work-performing robot power supply were exceeded during a portion of the programmed sequence of motions, but that such will not adversely affect the overall performance of the work-performing robot, that is, will not have a deleterious effect on the spray coating applied to the object by the gun 58. For example, the work-performing robot limits may have been exceeded during a relatively unimportant portion of the programmed sequence of motions when the spray gun was not operated, such as when the spray gun was being returned to a home position and/or when the spray gun was in its OFF condition, that is, not emitting spray coating material. Under such circumstances, it may be possible or appropriate to safely ignore the fact that an alarm indication was provided during the programming operation.

To enable the operator to make such an analysis, the condition of the spray gun 158 is monitored and the condition thereof recorded whenever an alarm condition occurs. By inspecting the records so produced, it is possible to determine whether alarm conditions occurred when the spray gun 158 was OFF and hence can possibly be safely ignored, or whether they occurred when the spray gun was ON and should not be ignored. Additionally, and to further assist the operator in determining whether an alarm condition can be ignored, the amount by which the limits of the work-performing robot link actuators and/or work-performing robot pump were exceeded during an alarm condition is computed and recorded. If the limit of the actuators and/or pump was exceeded by an amount deemed insignificant under the circumstances, the operator may decide that the alarm condition can be safely ignored.

The alarm sensing and indicating circuit of FIG. 3 includes a velocity transducing means 200-1, . . . 200-n for each link of the robot simulator. In the preferred embodiment wherein there are six degrees of freedom of the robot simulator, there are six velocity transducing means, each associated with a different link of the robot simulator. The velocity transducing means 200-1, . . . 200-n preferably include the angular position transducers 124, 130, 134, 146, 150, and 154, only two of which are shown in FIG. 3 for simplicity. The transducers 124, . . . 154 provide an electrical output on their respective output lines $P_1, \ldots P_n$ having a magnitude proportional to the relative angular position of its associated robot simulator link pivotally connected at the joint associated with the transducer. For example, position transducer 124 provides on its output line $P_1$ a voltage having a magnitude proportional to the angular position of the link 112 with respect to the base 110, while transducer 154 provides on its output line $P_n$ an electrical signal having a magnitude proportional to the angular position between the link 120 and the link 122.

The velocity transducers 200-1, . . . 200-n also include differentiating circuits 202-1, . . . 202-n which provide on their respective output lines $V_1, \ldots V_n$ electrical signals having a magnitude correlated to the derivative with respect to time of their respective inputs from their associated position transducers 124, . . . 154. Since the inputs to differentiating circuits 202-1, . . . 202-n are time-varying position signals associated with the links 112, 114, 116, 118, 120, and 122, the differentiated outputs on lines $V_1, \ldots V_n$ are correlated to the velocities of the simulator robot links 112, 114, 116, 118, 120, and 122 present during the programming operation by reason of manual manipulation of gun 158.

Since the signal processing and alarm circuitry for each of the velocity transducers 200-1, . . . 200-n is identical, only the signal processing and alarm circuitry for velocity transducer 200-1 will be discussed in detail. Specifically, the velocity signal output from differentiating circuit 202-1 associated with the position transducer 124 of robot simulator link 112 is input to an alarm condition sensing means 204-1, preferably a comparator. The other input to the comparator 204-1 is provided by a velocity limit reference signal means 206-1 which provides on its output line $R_1$ a velocity limitation reference signal correlated to the velocity limit of the work-performing robot link 12 to which corresponds link 112 of the robot simulator. For example, if the link 12 of the work-performing robot is limited to an angular velocity of 50° per second by reason of inherent limitations of its associated actuator 23, a signal will be output from the velocity limit reference source 206-1 on line $R_1$, correlated in magnitude to the 50° per second velocity limitation of link 12. The comparator 204-1 provides on its output line $XL_1$ an alarm signal in the event that the velocity of the robot simulator link 112 during programming exceeds the velocity limit for work-performing robot link 12 established by the velocity limit reference source 206-1.

The alarm signal on line $XL_1$, which may last only momentarily if the velocity limit is exceeded only momentarily, is input to a storage circuit 208-1, providing on its output line an alarm signal which is sustained until such time as the storage circuit 208-1 is reset by providing an appropriate input to its reset terminal by, for example, momentarily depressing a switch 211-1. The sustained alarm signal output from storage circuit 208-1 is input to an alarm indicating means 213 which provides a humanly perceptible alarm indication. In a preferred form, the alarm indicating means 213 includes a link alarm indicator 215-1 which provides a visually perceptible indication that the velocity of link 112 during programming has exceeded the velocity limit for its corresponding work-performing robot link 112. The visual indication provided by the link alarm indicator 215-1 will continue until the storage circuit 208-1 is reset by momentary actuation of the reset switch 211-1. Since the visual link alarm indicator 215-1 is uniquely associated with simulator robot link 112, which in turn corresponds to work-performing robot link 12, the visual indication provided by indicator 215-1 uniquely identifies the link 12 of the work-performing robot whose velocity limit was exceeded during programming by excessive operator manual manipulation of the gun 58 mounted to the simulator robot.

Also included in the alarm indicating means 213 is a system alarm indicator circuit 217. The sustained link alarm signal output from the storage circuit 208-1 corresponding to link 112 of the simulator robot and link 12 of the work-performing robot is input to the system alarm indicating circuit 217, which is also responsive to the other link alarm signal storage circuits 208-2, . . . 208-n associated with the other links 114, 116, 118, 120, and 122 of the robot simulator corresponding to the links 14, 16, 18, 20, and 22 of the work-performing robot. The system alarm circuit 217 includes a logical OR gate 219 which is connected to the output lines of all of the link alarm signal storage circuits 208-1, . . . 208-n. Logical OR gate 219 provides on its output line a system alarm signal when any one or more of the link alarm storage circuits input thereto associated with the individual links of the robot is in an alarm condition. The output of logical OR gate 219 is input to a power amplifier 221 which provides on its output line an input to a system alarm indicator 223 which, in a preferred form, provides an audible alarm.

Thus, an audible alarm is provided by the system alarm indicator 223 should, during programming a sequence of motions with the simulator robot, the velocity limit of one or more of the links 12, 14, 16, 18, 20, and 22 of the work-performing robot be exceeded. The system alarm indication is in addition to the individual audible link alarm indications provided by the plural link alarm indicators 215-1, . . . 215-n which are provided when, during programming of the robot simulator, the velocity limit of one or more of the links 12, 14, 16, 18, 20, or 22 of the work-performing robot is exceeded. The audible system alarm indication during simulator robot programming immediately alerts the operator to the fact that the capability of the work-performing robot has been exceeded. The programming operator can then visually check the array of visual link alarm indicators, 215-1, . . . 215-n which may, for example, be in the form of individual flashing lights, to determine which one or more of the work-performing robot links 12, 14, 16, 18, 20, or 22 had their velocity limitations exceeded during the programming operation. With this information, the programming operator, if he deems it desirable, can either continue the robot programming operation or start the programming operation again at a slower rate with a view to avoiding exceeding the velocity limits of the work-performing robot. In either case, the programming operator will reset the alarm circuit storage devices 208-1, . . . 208-n by actuating the reset switches 211-1, . . . 211-n. In this way, the system is readied in the event further programming, either a restart or continuation, results in excessive link velocities.

In addition to determining whether, during a robot programming operation, the velocity limitations of the individual links 12, 14, 16, 18, 20, 22 have been exceeded, the circuit of FIG. 3 also determines whether the power limitation of the pump which provides pressurized hydraulic fluid to the actuators 23, 28, 33, 44, 48, and 52 of the work-performing robot has been exceeded. To accomplish this objective the velocity signals output on lines $V_1, \ldots V_n$ from the differentiating circuits 202-1, . . . 202-n are added in a summing circuit 225. The summing circuit 225 provides on its output line SV a signal correlated to the sum of the velocities of the individual links on lines $V_1, \ldots V_n$ during the robot programming operation. The velocity summation signal output on line SV from the summing circuit 225 is input to an excessive power alarm sensing means 227, for example, a comparator. The comparator 227 is also provided with a reference signal input on line SR, correlated to the power limit or capacity of the system pump of the work-performing robot, from an excessive power limit reference signal source 229. The comparator 227 provides an excessive power alarm signal on its output line XSL in the event the aggregate or total of the velocities of the robot simulator links 112, 114, 116, 118, 120, 122 exceeds the power capabilities of the pump which supplies hydraulic fluid to the individual actuators, 23, 28, 33, 44, 48, 52 of the work-performing robot.

The excessive power alarm signal from the comparator 227 on line XSL is input to an excessive power alarm condition storage circuit 230, which until reset by momentary actuation of reset switch 231, provides a sustained excessive power alarm signal on its output line to an excessive power alarm indicator 233. The alarm provided by the excessive power alarm condition indicator 233 may be of any suitable type, such as a visually perceptible flashing light or an audibly perceptible siren.

To further facilitate evaluation of whether a sequence of recorded motions programmed by manipulating the simulator robot gun 158 is suitable for input to the work-performing robot, the link alarms associated with the various work-performing robot links, as well as the excessive power alarm associated with the work-performing robot pump, are recorded along with information which reflects whether the spray gun 148 was actuated or deactuated at the time the alarm condition occurred. To accomplish this objective, the extent to which the robot simulator link velocity exceeded the velocity limitation of its associated work-performing robot link is recorded along with information indicating whether at the instant the link alarm condition occurred the gun 158 was actuated or deactuated.

The circuitry utilized to determine the excess link velocity at the time of a link alarm condition is identical for each of the links. Therefore, the circuitry used for only one of the links, link 12 (112), is described. Specifically, the excess velocity information for work-performing robot link 12 is obtained, as seen in FIG. 4, utilizing an AND gate 235-1 and an operational amplifier 237-1. The AND gate 235-1 is connected to both the output line $V_1$ of the velocity transducer 200-1 and the output line $XL_1$ of the comparator or link alarm sensor 204-1. With these inputs to the AND gate 235-1, the AND gate provides on its output line a signal correlated in magnitude to the velocity of the robot simulator link 112 at the instant an alarm condition is sensed by the comparator 204-1 associated with that link. The velocity signal associated with simulator robot link 112 at the time of a link alarm condition provided by the output of AND gate 235-1 is input to an operational amplifier 237-1. The other input to the operational amplifier 237-1 is connected to output line $R_1$ of the velocity signal reference source 106-1 associated with work-performing robot link 12. The operational amplifier 237-1 operates as a subtraction circuit, providing on its output line $\Delta XL_1$ a signal correlated to the amount by which the actual velocity of simulator robot link 112 exceeds the velocity limit for work-performing robot link 12 at the time an alarm condition is sensed for that link. The excess velocity signal provided at the output $\Delta XL_1$ of the operational amplifier 237-1 is input to a multi-channel recorder, such as a printer 239, which provides a printed record 241 of the fact that the velocity limit for work-performing robot link 12 was exceeded and, in particular, the extent to which it was exceeded. Similar records are provided for the other robot links.

To monitor the condition of the gun 158, a gun ON/OFF monitoring circuit 243 is included which provides on its output line 245 a signal indicating whether the gun is ON or OFF. This information is recorded by the recorder 239 each time a link alarm condition event is recorded. To accomplish this, an OR gate 247 is provided which is responsive to the alarm condition signals output on lines $XL_1, \ldots XL_n$ from all of the comparators 204-1, . . . 204-n. The OR gate 247 provides a gating signal to an AND gate 251 which gates the output of the gun ON/OFF monitor 243 on line 245 to the recorder 239 via line 253 each time a link alarm condition is sensed for each of the links of the robot. The gun ON/OFF monitor 243 may take any desired form which provides differing outputs on line 245 for ON and OFF conditions of the gun 158. For example, the gun ON/OFF monitor 243 could take the form of a voltage-controlled oscillator which provides on its output line 245 pulses of one frequency when the gun trigger switch 158d is ON during programming and pulses of a different frequency when the gun trigger switch is OFF.

Associated with the recorder 239 and responsive to the gated output of the gun ON/OFF monitor 243 on line 253 would be a suitable pulse frequency recognition circuit which, for example, when the gun is ON when an alarm event occurs respecting link 12 results in the printing on record 241 of the word "ON" in association with the excess link velocity alarm event information provided by line $\Delta XL_1$, and which when a link alarm condition occurs if the gun is OFF provides for printing the word "OFF" in association with the excess link velocity alarm event information.

Thus, the circuit of FIG. 4 provides a printed record 241 of link alarm events associated with the various robot links during programming, as well as whether the robot simulator gun 158 was ON or OFF during the link alarm condition. An analysis of such a record can then be made to determine whether a recorded program of robot motions obtained utilizing the robot simulator should be retained for input to the work-performing robot, or should be discarded.

In a similar manner, the circuit of FIG. 4 provides a printed record of the amount by which the pump power is exceeded during an excessive power alarm event while programming, and whether at the time of the excessive power alarm the gun 158 was ON or OFF. This is accomplished utilizing an AND circuit 255 and an operational amplifier 257. The AND gate 255 has one input connected to the velocity summation signal output line SV provided by the summation circuit 225 (FIG. 3) and the other input connected to the output on line XSL of the excess power sensor 227. AND circuit 255 provides on its output a signal correlated to the sum of the velocities of all of the links of the robot simulator at that point in time when an excessive power alarm condition occurs. This output from the AND gate 255 is input to the operational amplifier 257. The other input to the operational amplifier 257 is the excess power reference signal provided by the excess power reference signal source 229 on line SR. The operational amplifier 257 provides on its output to the printer recorder 239 a signal correlated to the amount by which the power capability of the work-performing robot pump is exceeded during an excessive power alarm condition. This information is recorded by the printer 239 on the record 241, in conjunction with information respecting the condition of the gun 158 at the time of such excess power alarm provided by the gun ON/OFF monitor 243 as gated by AND gate 251 when the OR gate 247 is strobed by the excessive power alarm signal a line XSL from the excessive power alarm condition can be safely ignored or should be used as a basis for discarding the programmed motions derived utilizing the simulator robot.

One of the advantages of recording the extent to which the aggregate or total velocity exceeds the limit during an excessive power alarm condition is that with this information a decision can be made whether, by increasing the size of the hydraulic pump utilized to drive the actuators of the work-performing robot, the programmed sequence of motions which caused the excess power alarm condition can be input to the work-performing robot without creating an excess power alarm condition, that is, without overloading the higher capacity hydraulic pump. It is entirely possible, and in fact occurs in practice, that a programmed sequence of motions will overload an hydraulic pump having a specific capacity, but will not overload an hydraulic pump having greater capacity. When this occurs, it is possible, by substituting a larger capacity pump, to avoid a pump power overload.

With the circuit of FIG. 5, certain of the signal processing functions are performed at a location remote from the robot simulator. Specifically, the differentiating circuits 202-1, . . . 202-$n$ for deriving the velocities of the robot simulator links from the position transducers 124, . . . 154 as well as comparators 204-1, . . . 204-$n$ for comparing the robot simulator link velocities to the velocity limitations for the work-performing robot links provided by reference signal sources 206-1, . . . 206-$n$, are performed at a remote location. The resulting link alarm condition signals on lines $XL_1$, . . . $XL_n$ are transmitted to the site of the robot simulator where they are stored in storage circuit 208-1, . . . 208-$n$ and the storage circuit outputs are input to link alarm indicators 215-1, . . . 215-$n$ for providing the desired humanly perceptible link alarm indications to the programming operator. The link alarm signals on lines $XL_1$, . . . $XL_n$ are also input to OR gate 219, for actuating the system alarm indicator 223 via power amplifier 221. An inexpensive communication link 268, such as a telephone line, can be used to connect the site of the robot simulator with the remote site having the velocity derivation circuitry, velocity reference signal source, and the alarm condition sensing comparator circuits. If the differentiating circuits 202-1, . . . 202-$n$, the velocity reference signal sources 206-1, . . . 206-$n$, and the velocity signal sensing comparators 208-1, . . . 208-$n$ are located remotely, suitable analog-to-digital converters 260-1, . . . 260-$n$ and digital-to-analog converters 262-1, . . . 262-$n$ are provided. Additionally, multiplexing circuits 264 and 266 are included to facilitate time-sharing of the communication link 268 with the various analog-to-digital converters 260-1, . . . 260-$n$ and digital-to-analog converters 262-1, . . . 262-$n$.

By remotely locating certain portions of the signal processing circuitry, as shown in FIG. 5, the remotely located signal processing circuitry can be time-shared with plural robot simulators and their associated alarm condition indicators, producing circuit economies by avoiding duplication. If desired, the operational amplifier 257 shown in FIG. 4, which provides an output during an excess power alarm condition of the extent to which the power capability of the pump is exceeded, could be located remote from the site of the robot simulator to facilitate further time-sharing of circuit components and the attendant economies of time-sharing.

A further limitation on the maximum angular velocity of the links of the work-performing robot, totally independent of pump and/or actuator limitations, inheres in the fact that the links, by reason of their inherent construction and strength, are limited in terms of the maximum permissible acceleration-induced stress and deflection levels which they can withstand. When velocity of a robot link changes, i.e., decelerates or accelerates, the link is stressed and deflects due to inertial effects. For a given link construction, there is a limit on the permissible stress and deflection to which the link can be subjected.

If desired, the principles of this invention can be extended to provide the programming operator with excessive stress/deflection alarm indications when a motion or sequence of motions programmed on the simulator robot would, were the work-performing robot provided with the resulting program, produce stress or deflection levels in the work-performing robot links which are excessive. This result can be accomplished by providing means for monitoring the acceleration of the simulator robot links, and continuously comparing the simulator robot link accelerations with reference values correlated to the maximum permissible stress and/or deflection levels for the corresponding work-performing robot links. When the simulator robot link accelerations exceed the maximum permissible values, excess stress/deflection alarm signals are provided. The alarm signals are stored and input to suitable excess stress/deflection alarm condition indicators.

A circuit capable of providing indications of excess stress and/or deflection could readily be made by slight modifications to the circuit of FIG. 3. Specifically, the velocity transducers 100-1 . . . 100-n are replaced by acceleration transducers which monitor the acceleration of the respective simulator robot links. Additionally, the reference signal sources 106-1 . . . 106-n are adjusted such that their outputs on line $R_1, \ldots R_n$ are correlated to maximum permissible accelerations for their respectively associated work-performing robot links. With these two modifications, the circuit of FIG. 3 can provide individual link alarm indications, as well as a system alarm indication, when the motions of the simulator robot, were such input to the work-performing robot, would result in excessive stress and/or deflection of the work-performing robot links.

The signal processing provided by the circuits of FIGS. 3, 4, and 5 can be accomplished utilizing a specially programmed microcomputer, minicomputer, or the like.

In addition to time-sharing with plural robot simulators and their associated alarm condition indicators, the remotely located components shown in FIG. 5, such as, the digital-to-analog converters, differentiators, comparators, and reference signal sources, certain circuit economies can be realized by time-sharing a single analog-to-digital converter with the velocity transducers associated with the links of the simulator robot. Similarly, the digital-to-analog converters, the differentiating circuits, and comparators could be replaced by a single digital-to-analog converter, a single differentiating circuit, and single comparator which could all be time-shared with the various reference signal sources associated with the robot links.

If desired, and instead of recording the ON/OFF condition of the gun provided by the gun ON/OFF monitor 143 shown in the circuit of FIG. 4, the output of the gun ON/OFF monitor could be utilized to inhibit the production of an alarm condition indication if, when one or more of the link velocity limits were exceeded during programming, the gun was OFF. Stated differently, if excessive link velocity can be tolerated when the gun is OFF and coating material is not being emitted, it may be desirable to inhibit the production of a link alarm indication rather than provide the link alarm indication and thereafter have the operator ignore it.

The outputs of the link velocity limit reference sources 106-1 . . . 106-n and the excessive power reference source 129 are correlated to the respective capacities of the particular link actuators and pump of a particular work-performing robot. If different models of work-performing robots are available having actuators and pumps of varying capacities, the link velocity limit reference sources and excessive power reference source must be adjusted such that their output reference signals correspond to the capacity of the link actuators and pump of the particular work-performing robot with respect to which a particular programmed sequence of motions is evaluated.

The system of this invention can be utilized to determine which model robot, for example, high capacity, intermediate capacity, or low capacity, can be utilized to execute a particular programmed sequence of motions without overloading either the robot pump or actuators. This can be accomplished by successively programming the sequence of motions on the simulator robot with the reference signal sources successively adjusted to provide output signals corresponding to the different limits for the different models of work-performing robots. For example, the reference signal sources can be adjusted initially to correspond to the lowest capacity work-performing robot. If the sequence of motions programmed on the simulator robot does not result in alarm indications with the reference sources adjusted for the lowest capacity work-performing robot model, the programmed sequence of motions can be safely performed on the low capacity work-performing robot.

If alarm indications occur when the reference sources are adjusted for the lowest capacity work-performing robot, the reference sources can be readjusted to provide outputs corresponding to the limits of the intermediate capacity work-performing robot model. With the reference sources so adjusted, the sequence of motions can again be programmed using the simulator robot. If no alarm indications are produced, the programmed sequence of motions can be safely input to the intermediate capacity work-performing robot. If alarm indications occur with the reference sources so adjusted, the reference sources can be again adjusted, this time for the next highest capacity work-performing robot, and the evaluation process can be again carried out to determine if the desired sequence of motions can be safely carried out with the work-performing robot of this next highest capacity.

In accordance with a modification of the foregoing, the individual link velocities, as well as the aggregate of all the link velocities, could be compared simultaneously with different reference values corresponding to different capacity work-performing robots utilizing plural comparators or a single time-shared comparator. In this way, a determination could be made in a single programming operation which, if any, of the different capacity work-performing robots could be used to execute a particular programmed sequence of motions.

Finally, while the invention has been described in connection with a robot having rotary hydraulic actuators, it should be understood that the invention is equally applicable to robots using linearly movable actuators, or a combination of both linear and rotary actuators, and/or using actuators of other than the hydraulic type such as electrical, pneumatic, etc.

What is claimed is:

1. A system for evaluating the performance capability of a relatively massive, work-performing, multi-link, multi-degree of freedom robot with respect to a series of programmable motions, said robot having different velocity limitations for each of said links, comprising:

a relatively lightweight hand manipulatable robot simulator having multiple links connected to permit relative motion therebetween to define plural degrees of freedom, said simulator links and degrees of freedom simulating those of said work-performing robot, velocity transducing means associated with said simulator links to provide actual velocity signals correlated to the actual velocity of said simulator links when said simulator is hand manipulated through a series of programmable motions, means for establishing velocity limitation reference signals correlated to velocity limitations of said work-performing robot links, alarm condition sensing means responsive to said actual velocity signals and said velocity limitation reference signals for providing different alarm signals when alarm conditions exist for different links due to the velocity of said simulator links exceeding said velocity limitations of said work-performing robot links, and alarm indicating means responsive to said alarm signals for providing a humanly perceptible alarm indication substantially concurrently with the occurrence of an alarm condition.

2. The system of claim 1 wherein said alarm indicating means includes plural link alarm indicators each responsive to a different alarm condition sensing means for a different link for providing different humanly perceptible alarm indications uniquely identifiable with different links.

3. The system of claim 2 wherein said alarm indicating means further includes an additional humanly perceptible system alarm indicator collectively responsive to said different alarm signals for providing a humanly perceptible system alarm indication in the event one or more link alarm conditions exist.

4. The system of claims 1 or 2 or 3 further including
a single power source, having a power limit, for powering a specific plurality of links of said work-performing robot, means for establishing an excessive power limit reference signal correlated to the maximum permissible sum of velocities of said specific plurality of work-performing robot links which can be powered by a single power source at any given instant of time, said sum being less than the total of said velocity limits of each of said links of said specific plurality of links of said work-performing robot, means for summing the actual velocity signals of the simulator links corresponding to said specific plurality of work-performing robot links powered by said single power source and providing a summation signal correlated thereto, excessive power alarm sensing means responsive to said summation signal and said excessive power limit reference signal for providing an excessive power alarm signal when the power limit of said power source is exceeded collectively by said specific plurality of links although not exceeded by the individual velocity limit of any one of said individual links of said specific plurality, and excessive power alarm condition indicating means responsive to said excessive power alarm signal for providing a humanly perceptible indication when an alarm condition exists by reason of said limit of said power source being exceeded.

5. The system of claim 3 wherein said plural link alarm indicators provide visually perceptible alarms uniquely identifiable with said different links, and wherein said system alarm indicator provides an audible alarm.

6. The system of claim 1 further including a switch element associated with said robot simulator manually operable between OFF and ON conditions corresponding to OFF and ON conditions of a utilization device movable by said massive robot, means to monitor the condition of said switch element when said robot simulator is hand manipulated to different positions, means to record said alarm signals, and means to record the monitored condition of said switch element in association with said record of said alarm signals to facilitate determination of the condition of said switch element at the time an alarm condition exists.

7. The system of claim 4 further including a switch element associated with said robot simulator manually operable between OFF and ON conditions corresponding to OFF and ON conditions of a utilization device movable by said work-performing robot, means to monitor the condition of said switch element when said robot simulator is hand manipulated to different positions, means to record said alarm signals, and means to record the condition of said switch element in association with said record of said alarm signals to facilitate determination of the condition of said switch element at the time an alarm condition exists.

8. The system of claim 1 further including means to record the amount by which the actual velocity of said simulator links exceeds said velocity limits under alarm conditions.

9. The system of claim 6 further including means to record the amount by which the actual velocity of said simulator links exceeds said velocity limits under alarm conditions, and wherein said switch element condition recording means is in association with said record of said amount by which said actual velocity of said simulator links exceeds said velocity limit under alarm conditions.

10. The system of claim 4 further including means to record the amount by which the actual velocity of said simulator links exceeds said velocity limits under alarm conditions, means to record the amount by which said summation signal exceeds said excessive power limit reference signal under alarm conditions, a switch element associated with said robot simulator manually operable between OFF and ON conditions corresponding to OFF and ON conditions of a utilization device movable by said work-performing robot, means to monitor the condition of said switch element when said robot simulator is hand manipulated to different positions, and means to record the condition of said switch element in association with said records of said excess simulator link velocity and said excess power.

11. The system of claim 1 further including means to sustain said alarm indication following termination of said alarm signal, and selectively operable means to terminate said sustained alarm indication.

12. The system of claim 4 further including means to sustain said alarm indications following termination of said alarm signals, and selectively operable means to terminate said sustained alarm indications.

13. The system of claim 1 wherein said velocity limitation reference signal means and said alarm condition sensing means are remotely located relative to said robot simulator, velocity transducing means and alarm indicating means, and further including a communication link interconnecting said remotely located means and said transducing means and alarm indicating means.

14. The system of claim 4 wherein said excessive power limit reference signal means and said excessive power alarm sensing means are remotely located relative to said excessive power alarm condition indicating means, and wherein said excessive power alarm signal is transmitted to said excessive power alarm condition indicating means from said excessive power alarm sensing means via a communication link.

15. A method for evaluating the performance capability of a relatively massive, work-performing, multi-link, multi-degree of freedom robot with respect to a series of programmable motions, said robot having different velocity limitations for each of said links, comprising:
manually manipulating through said series of motions a relatively lightweight robot simulator having multiple links connected to permit relative motion therebetween to define plural degrees of freedom for simulating said work-performing robot,
generating, with velocity transducing means associated with said simulator links, actual velocity signals correlated to the actual velocity of said simulator links when said simulator is hand manipulated through a series of programmable motions,
generating velocity limitation reference signals correlated to velocity limitations of said work-performing robot links,
comparing said actual velocity signals and said velocity limitation reference signals and providing in response thereto different alarm signals when alarm conditions exist for different links due to the velocity of said simulator links exceeding said velocity limitations of said work-performing robot links, and
providing, in response to said alarm signals, a humanly perceptible alarm indication substantially concurrently with the occurrence of an alarm condition.

16. The method of claim 15 further including the steps of:
generating an excessive power limit reference signal correlated to the maximum permissible sum of velocities of said specific plurality of work-performing robot links which can be powered by a single power source at any given instant of time, said sum being less than the total of said velocity limits of each of said links of said specific plurality of links of said work-performing robot,
summing the actual velocity signals of the simulator links corresponding to said specific plurality of work-performing robot links powered by said single power source and providing a summation signal correlated thereto,
comparing said summation signal and said excessive power limit reference signal and providing in response thereto an excessive power alarm signal when the power limit of said power source is exceeded collectively by said specific plurality of links although not exceeded by the individual velocity limit of any one of said individual links of said specific plurality, and
providing a humanly perceptible excessive power alarm condition indication in response to said excessive power alarm signal when an alarm condition exists by reason of said limit of said power source being exceeded.

17. The method of claim 15 or 16 further including the steps of:
generating a signal correlated to the condition of a switch element associated with said robot simulator when said robot simulator is hand manipulated to different positions, said switch element being manually operable between OFF and ON conditions corresponding to OFF and ON conditions of a utilization device movable by said massive robot,
recording said alarm signals, and
recording the condition signal of said switch element in association with said record of said alarm signals to facilitate determination of the condition of said switch element at the time an alarm condition exists.

18. The method of claim 15 further including the steps of recording the amount by which the actual velocity of said simulator links exceeds said velocity limits under alarm conditions.

19. The method of claim 16 further including the steps of:
recording the amount by which the actual velocity of said simulator links exceeds said velocity limits under alarm conditions,
recording the amount by which said summation signal exceeds said aggregate power limit reference signal under alarm conditions,
generating a signal correlated to the condition of a switch element associated with said robot simulator when said robot simulator is hand manipulated to different positions, said switch element being manually operable between OFF and ON conditions corresponding to OFF and ON conditions of a utilization device movable by said work-performing robot, and
recording the condition of said switch element in association with said records of said excess simulator link velocity and said excess power.

20. A system for evaluating the performance capability of a relatively massive, work-performing, multi-link, multi-degree of freedom robot with respect to a series of programmable motions, said robot having different acceleration-induced stress and/or deflection limitations for each of said links, comprising:
a relatively lightweight hand manipulatable robot simulator having multiple links connected to permit relative motion therebetween to define plural degrees of freedom, said simulator links and degrees of freedom simulating those of said work-performing robot,
acceleration transducing means associated with said simulator links to provide actual acceleration signals correlated to the actual acceleration of said simulator links when said simulator is hand manipulated through a series of programmable motions,
means for establishing acceleration limitation reference signals correlated to acceleration limitations of said work-performing robot links,
alarm condition sensing means responsive to said actual acceleration signals and said acceleration limitation reference signals for providing different alarm signals when alarm conditions exist for different links due to the acceleration of said simulator links exceeding said acceleration limitations of said work-performing robot links, and alarm indicating means responsive to said alarm signals for providing a humanly perceptible alarm indication substantially concurrently with the occurrence of an alarm condition.

21. The system of claim 20 wherein said alarm indicating means includes plural link alarm indicators each responsive to a different alarm condition sensing means for a different link for providing different humanly perceptible alarm indications uniquely identifiable with different links.

22. The system of claim 21 wherein said alarm indicating means further includes an additional humanly perceptible system alarm indicator collectively responsive to said different alarm signals for providing a humanly perceptible system alarm indication in the event one or more link alarm conditions exist.

* * * * *